June 12, 1956   C. P. McCLELLAND   2,750,221
LATCH STRIKER ASSEMBLY
Filed Jan. 12, 1955

INVENTOR
Clarence P. McClelland
BY
J. E. Ross
ATTORNEY

United States Patent Office 2,750,221
Patented June 12, 1956

2,750,221

LATCH STRIKER ASSEMBLY

Clarence P. McClelland, Royal Oak, Mich., assignor to General Motors Corporation, Detroit, Mich., a corporation of Delaware Application January 12, 1955, Serial No. 481,300

8 Claims. (Cl. 292—341.18)

This invention relates to closure fasteners and more particularly to an adjustable striker and associated supporting structure for a latch mechanism.

In order to insure proper fit and co-action between a closure and the jamb or frame, it is a common practice to provide the latch mechanism with a striker element which may be adjustably positioned. This permits striker adjustment to insure proper engagement with the latch bolt. Thus, initial compensation for manufacturing variations during assembly and subsequent compensation for wear and other causes of misalignment may be corrected in an expedient manner. These features are especially desirable in latches for use in automotive vehicles such as for the instrument panel compartment door. In this use the latch is subject to vibration and repeated shock and in such use, it is desirable that adjustment may be made by the vehicle operator without the need for special tools or skill. Of equal importance is the facility of installation and initial adjustment in the manufacture of vehicles to reduce the cost of assembly. In the prior art the aforementioned features have been realized only at the expense of multiple and complex parts or time consuming and difficult installation and adjustment.

Accordingly, it is an object of this invention to provide an adjustable striker for latches which is constructed of simple and few parts which facilitate installation and adjustment.

Another object is to provide a striker and supporting structure of simple inexpensive parts which will withstand vibration and shock without accidental displacement.

A further object is to provide an adjustable striker mechanism which is easily accessible and adapted for adjustment without the need for special tools or skill.

In carrying out this invention there is provided a striker element adjustably mounted by screw thread engagement with a sheet metal support bracket. The bracket is preferably of one piece, integral construction provided with self-locking screw thread engaging means and which furnishes support at spaced points for the striker.

A more complete understanding of the invention by which the foregoing objects are achieved may be had from the description which follows taken with the accompanying drawings in which.

Figure 1:
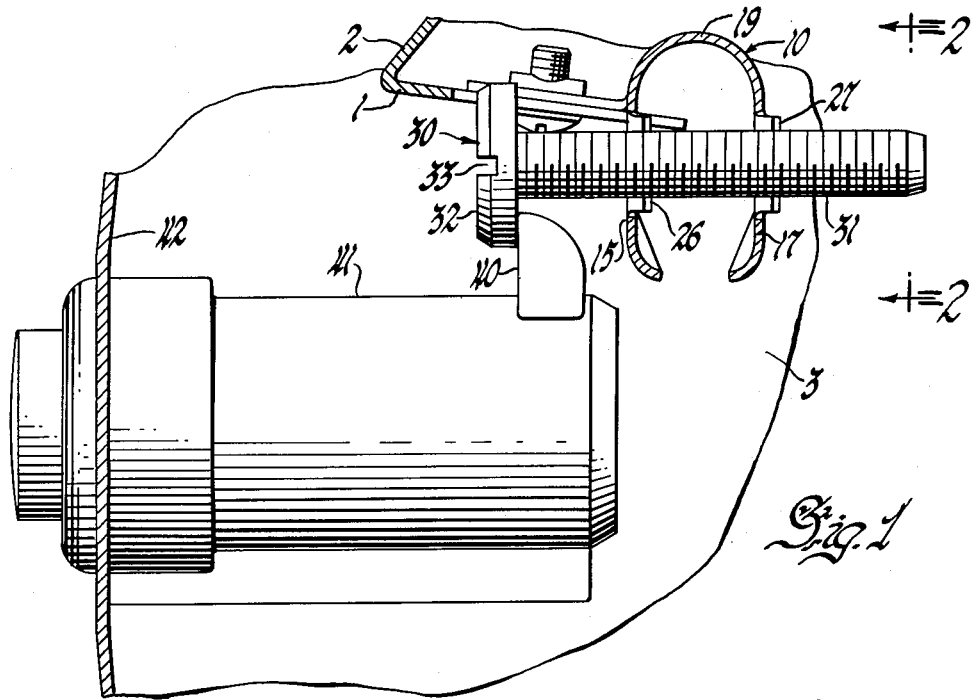
Figure 1 is an elevation view partially in section of the inventive striker and support bracket in a typical embodiment.

Referring now to the drawing, there is shown an illustrative embodiment of the invention in a latch mechanism for the instrument panel compartment door of an automotive vehicle. In the illustrative embodiment the inventive support bracket 10 with striker 30 is mounted upon a generally horizontal flange portion 1 of the frame or instrument panel 2 which delimits one extremity of a compartment 3. A latch bolt 40, adapted to coact with striker 30, is reciprocably mounted in the lock cylinder 41 which in turn is mounted upon the movable closure or door 42. The door 42 is suitably hinged by means not shown for pivotal motion toward and away from the instrument panel 2.

Figure 3:
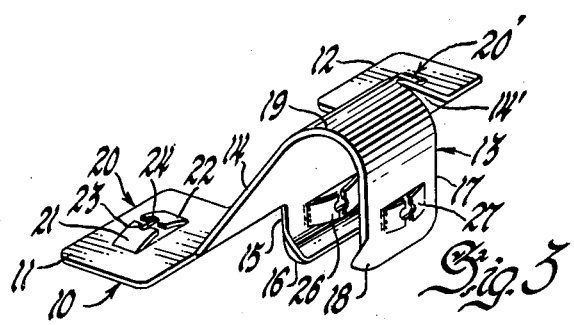
Figure 3 is a perspective view of the support bracket for the striker.

The support bracket 10 is of one piece, integral construction of sheet metal, preferably having good resilient properties. The support bracket 10, the general configuration of which is best shown in Figure 3, comprises a pair of spaced mounting portions or plates 11 and 12. A generally U-shaped supporting portion, designated generally at 13, is integrally connected with the mounting plates 11 and 12 by web portions 14 and 14' respectively. The U-shaped supporting portion 13 extends transversely of the supporting plates 11 and 12 and includes a depending supporting member or leg 15 suitably provided with a reinforcing rib 16. A supporting member or leg 17 having a reinforcing rib 18 is disposed in spaced parallel relation with the member 15 and is integrally connected thereto by the intermediate arcuate portion 19.

To facilitate mounting of the bracket 10 on the flange 1, the mounting plates 11 and 12 are provided with integral self-locking screw thread engaging means 20 and 20' respectively. The term integral self-locking screw thread engaging means is used herein in a generic sense to denote that class of fasteners formed integrally in sheet metal with opposed engaging elements displaced from the plane of the sheet metal and adapted to grippingly engage a conventional screw threaded shank therebetween. A preferred embodiment of such self-locking screw thread engaging means comprises a pair of oppositely disposed engaging elements 21 and 22 which are both displaced to the same side of the plane of the sheet metal mounting portion 11. The engaging elements 21 and 22 are provided with arcuate shaped, spaced apart, end portions 23 and 24 respectively, adapted to receive a screw threaded shank therebetween. The spacing of arcuate end portions 23 and 24 is preferably somewhat less than the root diameter of the screw threaded shank and the engaging elements are offset relative to each other in the axial direction of the screw threaded shank an amount equal to one-half the pitch of the screw thread. This construction assures proper thread engagement between the self-locking engaging means and the screw threaded shank. Frictional constraint against rotation of the screw threaded shank is provided by the resilience and wedging action of the engaging elements.

Figure 2:
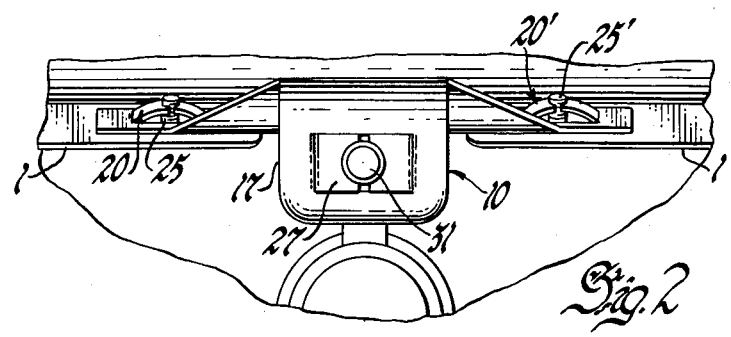
Figure 2 is a rear elevational view taken on line 2—2 of Figure 1.

Referring now to Figure 2, the supporting bracket 10 is secured to the flange 1 by screw threaded fasteners 25 and 25' extending through the flange 1 into engagement with the self-locking screw thread engaging means 20 and 20', respectively. Rotation of the screw threaded fasteners 25 and 25' to advance the same through the self-locking engaging means 20 and 20', respectively, produces a secure locking engagement by wedging action of the engaging means against the screw threaded fastener.

The supporting members 15 and 17 are also provided with self-locking screw thread engaging means 26 and 27 respectively which are suitably aligned to receive screw threaded shank 31 of the striker 30. The striker 30 is provided with a striker element or head portion 32 which defines a tool receiving recess 33. The screw threaded shank 31 extends through the self-locking screw thread engaging means 26 and 27 and may be adjustably positioned in an axial direction by rotation of the shank 31 by a screw driver blade inserted in tool receiving recess 33. The self-locking screw thread engaging means exert frictional constraint against rotation of the shank 31 by the resilient gripping engagement therewith. The striker 30, being supported at spaced points by the bracket 10, is adapted to withstand severe blows without displacement with respect to the panel 1 and because of the frictional constraint afforded by the self-locking screw threaded engaging means, the striker 30 is resistant to accidental displacement by vibration. It will be apparent that suitable support for the threaded shank may also be afforded by providing only one of the plates 15 and 17 with a self-locking screw thread engaging means and the other with an aligned opening to accommodate passage of the shank.

The installation of the supporting bracket 10 and the striker 30 is rendered very efficient by the self-locking screw thread engaging means 20 and 20' because the bracket may be readily positioned on the flange 1 and secured thereto by simple manipulation of fasteners 25 and 25'. When the door 42 is operated to the closed position, the latch bolt 40 engages the striker element 32 and is thereby reciprocated to permit complete closure of the door 42 against the panel 2. In the event the striker 30 is too far advanced or retracted in the bracket 10, adjustment may be made by mere rotation of the shank 31 to provide proper engagement of the striker element 32 with the latch bolt 40.

The many advantages afforded by the present invention will now be appreciated. The support bracket is constructed of a single piece of sheet metal and is of such configuration that it is well suited to forming by simple stamping operations. Installation is extremely simple and efficient in that it requires only conventional screw threaded fasteners which are grippingly engaged by the supporting bracket itself. Initial adjustment of the striker requires only rotative motion thereof which may be effected by a suitable hand tool engaging the same at an easily accessible location and the striker is readily adjustable by an unskilled person to compensate for wear or other causes of misalignment which may occur in use. The striker is ruggedly supported against accidental displacement by severe shock and vibration.

Although this invention has been described with respect to a particular embodiment, such embodiment is illustrative only and is not to be construed in a limiting sense. Many variations and modifications within the spirit and scope of the invention will now occur to those skilled in the art. For a definition of the invention, reference is made to the appended claims.

I claim:

1. A striker support bracket of resilient sheet meal for use in a latch mechanism, said bracket comprising a mounting portion, a pair of spaced supporting members integrally connected with said mounting portion, one of said members being provided with integral self-locking screw thread engaging means, and the other of said members defining an opening in alignment with said engaging means to accommodate the passage of a screw threaded shank.

2. A sheet metal striker support bracket for use in a latch mechanism, said bracket having a mounting portion, a U-shaped supporting portion connected with said mounting portion by an integral web, one leg of said U-shaped supporting portion being provided with self-locking screw thread engaging means, and the other leg of said U-shaped supporting portion defining an opening in alignment with said engaging means to accommodate the passage of a screw threaded shank.

3. A latch striker support bracket of sheet metal having a pair of laterally spaced mounting portions, an integral web connected to each of said mounting portions and a supporting portion integral with and disposed between said webs, said supporting portion including a first supporting member extending transversely of said mounting portions and defining a centrally located opening therein, a second supporting member in spaced parallel relation to said first supporting member and being provided with integral self-locking screw thread engaging means in alignment with said opening, and an arcuate intermediate portion integrally connecting said members together.

4. A sheet metal striker support bracket for a latch mechanism, said bracket comprising a pair of laterally spaced mounting portions each provided with integral self-locking screw thread engaging means, a supporting portion connected to each of said mounting portions by an integral web, said supporting portion including a first supporting member extending transversely of said mounting portions and provided with self-locking screw thread engaging means, and a second supporting member in spaced parallel relation to said first supporting member and being integrally connected thereto by an intermediate arcuate portion, said second supporting member being provided with self-locking screw thread engaging means in alignment with the last mentioned engaging means.

5. In combination, a striker support bracket of sheet metal having a mounting portion, a U-shaped supporting portion integrally connected to said mounting portion, one leg of said U-shaped supporting portion being provided with integral self-locking screw thread engaging means, the other leg of said U-shaped supporting portion defining an opening in alignment with said engaging means, and an adjustable striker including a threaded shank extending through said opening and through said engaging means.

6. In combination, a striker support bracket of sheet metal having a mounting portion and a pair of spaced supporting members integrally connected with said mounting portion, one of said members being provided with integral self-locking screw thread engaging means, the other of said members defining an opening in alignment with said engaging members, and an adjustable striker including a threaded shank extending through said opening and said engaging means.

7. In combination, a striker support bracket of sheet metal having a pair of laterally spaced mounting portions, an integral web connected to each of said mounting portions and a supporting portion integral with and disposed between said webs, said supporting portion including a first supporting member extending transversely of said mounting portions and provided with self-locking screw thread engaging means, a second supporting member in spaced parallel relation to said first supporting member and defining an opening in alignment with said engaging means, said members being integrally connected by an intermediate portion, and an adjustable striker having a threaded shank extending through said opening and said engaging means.

8. In combination, a striker support bracket of sheet metal having a pair of laterally spaced mounting portions provided with integral self-locking screw thread engaging means, a supporting portion connected to each of said mounting portions by an integral web, said supporting portion including a first supporting member extending transversely of said mounting portions and provided with self-locking screw thread engaging means, a second supporting member in spaced parallel relation to said first supporting member and being integrally connected therewith by an intermediate arcuate portion, said second supporting member defining an opening in alignment with the last mentioned engaging means, and an adjustable striker having a threaded shank and a striker element integrally connected thereto, said threaded shank extending through said opening and the said last mentioned engaging means whereby said striker element may be adjustably positioned by rotation of said shank.

References Cited in the file of this patent

UNITED STATES PATENTS

| | | |
|---|---|---|
| 1,091,592 | Schmidgall | Mar. 31, 1914 |
| 1,119,321 | Schmidgall | Dec. 1, 1914 |
| 2,019,408 | Grill | Oct. 29, 1935 |
| 2,265,691 | Hogg | Dec. 9, 1941 |
| 2,329,158 | Gill | Sept. 7, 1943 |